United States Patent Office 3,345,877
Patented Oct. 10, 1967

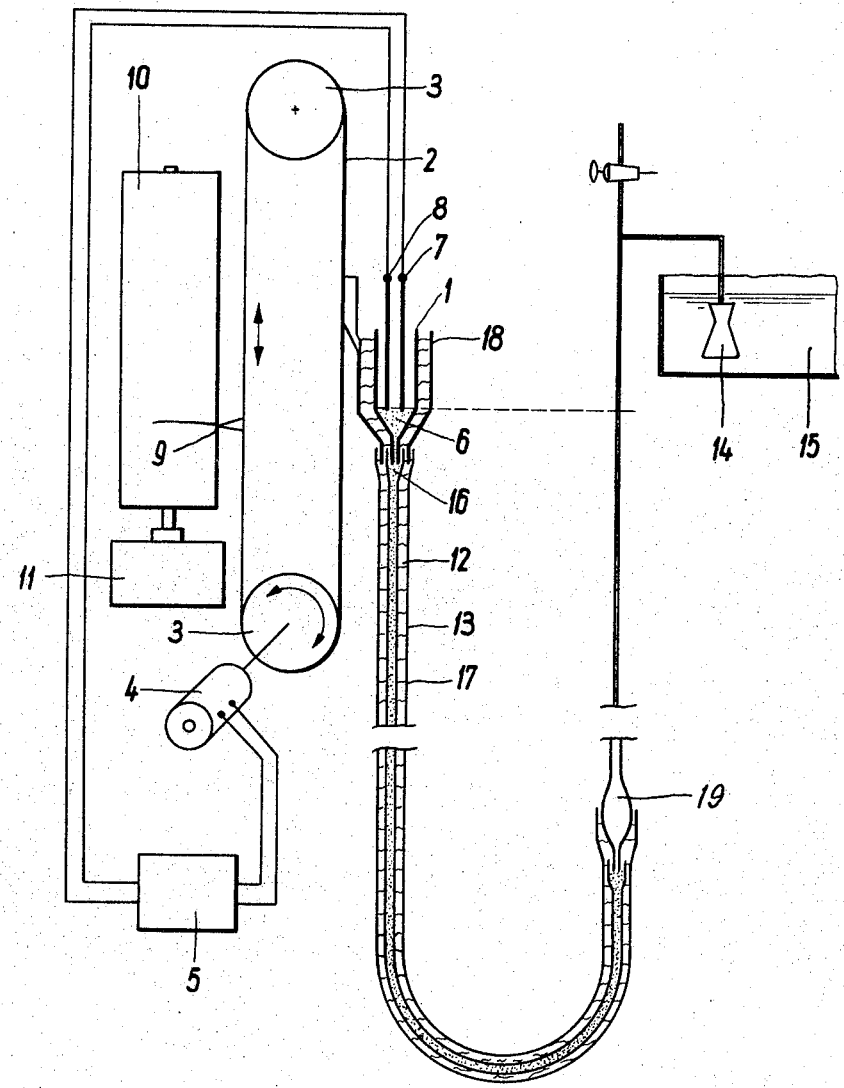

3,345,877
APPARATUS FOR MEASURING SMALL
VARIATIONS IN GAS PRESSURE
Otto Koelle, Melsungen, Germany, assignor to
B. Braun, Melsungen, Germany
Filed June 17, 1965, Ser. No. 464,609
Claims priority, application Germany, June 19, 1964,
B 77,322
10 Claims. (Cl. 73—401)

ABSTRACT OF THE DISCLOSURE

An apparatus for measuring small variations in gas pressure is provided, wherein a gas the pressure variations of which are to be measured is located in a measuring space, a first flexible semi-permeable tube extends at one end from the pressure measuring space, a sealing liquid containing salt additives is located in the first flexible semi-permeable tube for sealing the pressure measuring space. The first flexible semi-permeable tube is surrounded by a second flexible tube which holds replacement liquid containing less salt than the sealing liquid in the second flexible semi-permeable tube, and control means are provided for maintaining the level of the sealing liquid at the other end of the first flexible semi-permeable tube at a predetermined level. The control means comprise moving means which are fixed to such other end of the first flexible semi-permeable tube for moving such other end of the first flexible semi-permeable tube up or down, and also include energizing means coupled to the moving means and in operative proximity with the sealing liquid for energizing the moving means to move the first flexible semi-permeable tube in a direction determined by the level of the sealing liquid relative to the predetermined level.

The present invention relates to apparatus for measuring small variations in gas pressure. More particularly the invention relates to the replacement of sealing liquid in apparatus for measuring small variations in gas pressure.

Appliances for measuring or registering small variations in pressure or gas quantities may be made in accordance with various basic principles. For carrying out manometric tests in which small variations in gas quantities have to be measured in comparatively small containers, appliances play a special part in which the sealing liquid simultaneously serves for measuring or compensating the pressure. Water, "Brodie's solution," mercury or other conductive solutions are used as sealing liquid. In such appliances the quantity of the sealing liquid present in the measuring system is always of considerable importance. Attempts to maintain a constant quantity of liquid throughout the duration of the measurements are nullified by the circumstances that liquid losses occur through the surfaces where the sealing liquid is in contact with air, and through the flexible tube containing the sealing liquid; such losses being by evaporation or diffusion. The sealing liquid is contained in light and comparatively thin flexible tubes, so that the measuring appliance, which is located at the upper end of a U-shaped arrangement formed by the flexible tube, may easily be moved in accordance with variations in pressure. The U-shaped flexible tube is connected at its other end to a reaction vessel.

The principal object of the present invention is to provide a new and improved apparatus for measuring small variations in gas pressure.

An object of the present invention is to provide efficient, effective and reliable replacement of sealing liquid in apparatus for measuring small variations in gas pressure.

In accordance with the present invention, apparatus for measuring small variations in gas pressure comprises a measuring space for accommodating gas the pressure variations of which are to be measured. A first flexible tube extends at one end from the measuring space and contains sealing liquid containing salt additives for sealing the measuring space. A second flexible tube surrounds the first flexible tube and contains replacement liquid containing less salt than the sealing liquid. The concentration of additives in one of the sealing liquid and the replacement liquid relative to the other causes the replacement liquid to osmose into the first flexible tube from the second flexible tube. Control apparatus maintains the level of the sealing liquid at the other end of the first flexible tube at a determined level.

In order that the present invention may be readily carried into effect, it will now be described with reference to the accompanying drawing, wherein the single figure is a schematic diagram of an embodiment of the apparatus for measuring small variations in gas pressure of the present invention.

In the figure, a pressure measuring device, which may comprise a double capillary pressure gage (not shown) may include a reaction vessel 14 which may be immersed, for example, in a thermostat bath 15. The pressure measuring device includes a measuring space for accommodating a gas, the pressure variations of which are to be measured. A first flexible tube 12 is connected at one end to the pressure measuring space of the pressure measuring device. The other end of the first flexible tube 13 is connected to the bottom of a vessel 1.

The first flexible tube 12 is bent in a substantially U-shaped configuration. The first flexible tube 12 contains sealing liquid 16. The sealing liquid 16 contains salt additives and functions to seal the pressure measuring space. The first flexible tube 12 may be made of any suitable flexible material and is preferably transparent. The first flexible tube 12 may be made of synthetic plastic material having sufficient flexibility such as, for example, polyvinyl chloride, polyethylene or polytetrafluoroethylene. Polyvinyl chloride tubing is thin and transparent and permits visual observation of the sealing liquid to determine its level and the presence of bubbles therein.

A second flexible tube 13 is positioned around the first flexible tube 12 so that said second tube surrounds said first tube. The outer diameter of the first flexible tube 12 is sufficiently smaller than the inner diameter of the second flexible tube 13 to permit a replacement liquid 17 to be contained in said second tube in the area between said first and second tubes. The replacement liquid is a liquid with a low salt concentration such as, for example, distilled water, and is also in the area between the vessel 1 and an outer vessel 18 surrounding said vessel 1. The replacement liquid 17 covers the entire length of the first flexible tube. The second flexible tube 13 may be made of the same material as the first flexible tube 12. Each of the first and second flexible tubes 12 and 13 may be made of natural or artificial rubber or any suitable flexible material.

The replacement liquid 17 has a salt concentration which is less than the salt concentration in the sealing liquid 16 or has no salt content at all. Thus, for example, the sealing liquid 16 may comprise Brodie's solution and the replacement liquid 17 may comprise distilled water. The concentration necessary to produce osmosis of the replacement liquid 17 into the first flexible tube 12 may be determined by test. The difference in salt concentrations of the sealing and replacement liquids may be provided so that after 12 to 24 hours, for example, the first flexible tube 12 may become impregnated or diffused to a degree wherein it functions as a semi-permeable membrane. The replacement liquid 17 then osmoses from the second flexible tube 13 into the first flexible tube 12.

A suitable soluble additive for the sealing liquid 16 may comprise lithium chloride. The sealing limits for lithium chloride are about 80% higher than for any other salts. If there is a non-uniform concentration or distribution of salt in the sealing liquid 16, the concentration or distribution lower down is greater than that further up and the measurement results may be inaccurate. If lithium chloride is added to the sealing liquid 16 in the amount of 40% by weight of salt relative to the weight of water, there is not likely to be a non-uniform concentration or distribution of salt in said sealing liquid. A suitable osmosis of replacement liquid 17 occurs, however, when said replacement liquid has a low salt concentration and the sealing liquid 16 has a high salt concentration.

The concentration of salt additive or substances dissolved in the sealing liquid 16 and/or of the substances or salt additive dissolved in the replacement liquid 17 are preferably selected so that sealing liquid which is lost is replaced by replacement liquid by osmosis of the replacement liquid from the second flexible tube 13 through the first flexible tube 12 into the sealing liquid.

Although it is preferable that the second flexible tube 13 or the replacement liquid in it cover the first flexible tube 12 over its entire length, the apparatus will operate satisfactorily if the entire length of said first flexible tube is not covered by said second flexible tube or by the replacement liquid in it. It is also preferable that the replacement liquid 17 cover both ends of the first flexible tube 12. Furthermore, although the first flexible tube 12 is generally positioned inside the second flexible tube 13 with the sealing liquid 16 in said first tube and with the replacement liquid 17 in said second tube, said replacement liquid may be contained in said first tube and said sealing liquid may be contained in said second tube.

The vessel 1 is affixed to an endless belt 2 guided by a pair of spaced guide rollers 3 in a substantially vertical direction. One of the guide rollers 3 such as, for example, the lower one, is driven by a motor 4. The motor 4 rotates either clockwise or counterclockwise under the control of an energizing source 5, which may comprise any suitable reversing energizing source such as, for example, a relay or switching circuit and a source of electrical energy.

The motor 4 is controlled by the energizing source 5 to move in a direction determined by the level 6 of the sealing liquid 16, relative to a determined level indicated by the broken line so that it maintains said sealing liquid at said determined level. When the vessel 1 is moved downward, the level 6 of the sealing liquid 16 inside said vessel rises and closes the circuit of the energizing source 5 by providing an electrical path between contacts 7 and 8. When the circuit of the energizing source 5 is closed, said energizing source energizes the motor 4 to rotate in its reverse direction.

When the vessel 1 is moved upward, the level 6 of the sealing liquid 16 inside said vessel drops below its contact level with the contacts 7 and 8 and thereby opens the circuit of the energizing source 5. When the circuit of the energizing source is opened, the motor 4 is rotated in its forward direction. As the vessel 1 is moved up and down by the motor 4, a marking device 9 of any suitable type marks a suitable medium on a drum 10. The drum 10 is driven by a drive 11 which may comprise a motor synchronized to the motor 4 or a coupling from the motor 4. The marking device may comprise an ink stylus, for example, and the medium may comprise paper, for example.

It is thus seen that the apparatus of the present invention functions to compensate for the loss of the sealing liquid 16 in an effective, efficient and reliable manner; lost sealing liquid being replaced by replacement liquid 17. Although the effect of sealing liquid loss may be compensated for by measuring errors in operation of the apparatus caused by such loss this is considerably more expensive for practical purposes than the replacement process of the present invention.

While the invention has been described by means of a specific example and in a specific embodiment, I do not wish to be limited thereto, for obvious modifications will occur to those skilled in the art without departing from the spirit and scope of the invention.

What I claim is:

1. Apparatus for measuring small variations in gas pressure, comprising
   pressure measuring means including a measuring space for accommodating gas the pressure variations of which are to be measured;
   a first flexible semi-permeable tube extending at one end from said pressure measuring space;
   sealing liquid containing salt additives in said first flexible semi-permeable tube for sealing said pressure measuring space;
   a second flexible tube surrounding said first flexible tube;
   replacement liquid containing less salt than said sealing liquid in said second flexible semi-permeable tube; and
   control means for maintaining the level of said sealing liquid at the other end of said first flexible semi-permeable tube at a determined level.

2. Apparatus for measuring small variations in gas pressure, comprising
   pressure measuring means including a measuring space for accommodating gas the pressure variations of which are to be measured;
   a first flexible semi-permeable tube extending at one end from said pressure measuring space;
   sealing liquid containing salt additives in said first flexible semi-permeable tube for sealing said pressure measuring space;
   a second flexible tube surrounding said first flexible tube;
   replacement liquid containing less salt than said sealing liquid in said second flexible tube, the concentration of additives in one of said sealing liquid and replacement liquid relative to the other causing said replacement liquid to enter into said first flexible semi-permeable tube from said second flexible tube; and
   control means for maintaining the level of said sealing liquid at the other end of said first flexible semi-permeable tube at a determined level.

3. Apparatus for measuring small variations in gas pressure, comprising
   pressure measuring means, including a measuring space for accommodating gas the pressure variations of which are to be measured;
   a first flexible semi-permeable tube extending at one end from said pressure measuring space;
   sealing liquid containing salt additives in said first flexible semi-permeable tube for sealing said pressure measuring space;
   a second flexible tube surrounding said first flexible tube;
   replacement liquid containing less salt than said sealing liquid in said second flexible tube, the concentration of additives in one of said sealing liquid and replacement liquid relative to the other causing said replacement liquid to osmose into said first flexible semi-permeable tube from said second flexible tube; and
   control means for maintaining the level of said sealing liquid at the other end of said first flexible semi-permeable tube at a determined level.

4. Apparatus as claimed in claim 3, wherein each of said first and second flexible tubes is made of transparent material.

5. Apparatus as claimed in claim 3, wherein each of said first and second flexible tubes is made of transparent synthetic material.

6. Apparatus as claimed in claim 3, wherein each of said first and second flexible tubes is made of plastic material.

7. Apparatus as claimed in claim 3, wherein each of said first and second flexible tubes is made of rubber.

8. Apparatus as claimed in claim 3, wherein said replacement liquid is salt-free.

9. Apparatus for measuring small variations in gas pressure, comprising
    pressure measuring means, including a measuring space for accommodating gas the pressure variations of which are to be measured;
    a first flexible semi-permeable tube extending at one end from said pressure measuring space;
    sealing liquid containing salt additives in said first flexible semi-permeable tube for sealing said pressure measuring space;
    a second flexible tube surrounding said first flexible tube;
    replacement liquid containing less salt than said sealing liquid in said second flexible tube, the concentration of additives in one of said sealing liquid and replacement liquid relative to the other causing said replacement liquid to osmose into said first flexible semi-permeable tube from said second flexible tube; and
    control means for maintaining the level of said sealing liquid at the other end of said first flexible semi-permeable tube at a determined level, said control means comprising moving means affixed to said other end of said first flexible semi-permeable tube for moving said other end of said first flexible semi-permeable tube up or down, and energizing means coupled to said moving means and in operative proximity with said sealing liquid for energizing said moving means to move said first flexible semi-permeable tube in a direction determined by the level of said sealing liquid relative to said determined level.

10. Apparatus as claimed in claim 9, further comprising recording means for recording the direction and magnitude of movement of said other end of said first flexible tube.

References Cited
UNITED STATES PATENTS

| 1,950,595 | 3/1934 | Clason | 73—401 X |
| 3,248,948 | 5/1966 | Keller et al. | 73—401 |

LOUIS R. PRINCE, *Primary Examiner.*

DONALD O. WOODIEL, *Assistant Examiner.*